US006954566B2

(12) United States Patent
Johannessen (10) Patent No.: US 6,954,566 B2
(45) Date of Patent: Oct. 11, 2005

(54) APPARATUS FOR THERMAL COMPENSATION OF AN ARRAYED WAVEGUIDE GRATING

(75) Inventor: Kjetil Johannessen, Trondheim (NO)

(73) Assignee: Intel Corporation, Santa Clara, CA (US)

( * ) Notice: Subject to any disclaimer, the term of this patent is extended or adjusted under 35 U.S.C. 154(b) by 371 days.

(21) Appl. No.: 10/205,275

(22) Filed: Jul. 25, 2002

(65) Prior Publication Data

US 2004/0017971 A1 Jan. 29, 2004

(51) Int. Cl.[7] .................................................. G02B 6/34
(52) U.S. Cl. .......................................... 385/37; 385/39
(58) Field of Search ...................... 385/37, 39; 362/122, 362/806, 805, 123

(56) References Cited

U.S. PATENT DOCUMENTS

| | | | | | |
|---|---|---|---|---|---|
| 1,677,972 | A | * | 7/1928 | Marks | 362/123 |
| 4,171,754 | A | * | 10/1979 | Rosado | 222/646 |
| 5,947,582 | A | * | 9/1999 | Huang | 362/122 |
| 6,222,963 | B1 | * | 4/2001 | Grand et al. | 385/39 |
| 6,364,501 | B1 | * | 4/2002 | Tai | 362/122 |
| 6,456,763 | B2 | * | 9/2002 | Kashihara et al. | 385/37 |
| 6,588,914 | B1 | * | 7/2003 | Tang | 362/123 |
| 6,668,117 | B2 | * | 12/2003 | Hasegawa et al. | 385/37 |
| 6,738,545 | B1 | * | 5/2004 | Purchase et al. | 385/37 |
| 6,788,848 | B2 | * | 9/2004 | Yoneda | 385/37 |
| 2002/0009263 | A1 | * | 1/2002 | Kashihara et al. | 385/37 |
| 2002/0085808 | A1 | * | 7/2002 | Ooyama et al. | 385/37 |

FOREIGN PATENT DOCUMENTS

| | | |
|---|---|---|
| EP | 1 087 246 | 3/2001 |
| JP | 2001337233 | 7/2001 |

OTHER PUBLICATIONS

International Search Report from PCT/US03/22783.
Chapter 5—Material Properties, U.S. Army Corps of Engineers, Publication ETL 1110–2–548 (1997), pp. 5–1 to 5–8.
Doerr, "Devices using planar waveguide gratings and lenses," pp. 35 and 36 (1999).
Eldada, et al., "Thermo–optically active polymeric photonic components," pp. 124–126.
Hattori, et al. "PLC–Based Optical Add/Drop Switch with Automatic Level Control," *Journal of Lightwave Technology* 17(12):2562–2570 (1999).
Heismann, et al. "Signal Tracking and Performance Monitoring In Multi–Wavelength Optical Networks," 22nd European Conference on Optical Communication pp. 3.47–3.50 (1996).
Inoue, et al. "Polarization Mode Converter with Polyimide Half Waveplate in Silica–Based Planar Lightwave Circuits," *Photonics Technology Letters* 6(5):626–628 (1994).

(Continued)

Primary Examiner—Laura K. Tso
(74) Attorney, Agent, or Firm—Marshall, Gerstein & Borun LLP (57) ABSTRACT

An arrayed waveguide grating including a waveguide array extending between two free propagation regions is disclosed. One free propagation region is coupled to an input waveguide, and the other free propagation region is coupled to output waveguides. In an example, the input-side free propagation region has two sections that are moveable relative to one another. Movement is achieved by using, for example, a thermally responsive actuator that moves the input waveguide a desired distance to compensate for a temperature change. An arm formed of a low thermal expansion coefficient metal may be used as a thermally responsive actuator moving a substrate. In another example, both the input side and the output side free propagation regions have sections moveable relative to one another and, therefore, less movement is required to correct for thermal variations. An N×N arrayed waveguide grating may also be formed.

26 Claims, 7 Drawing Sheets

OTHER PUBLICATIONS

Ishii, et al. "Packaging and Environmental Stability of Thermally Controlled Arrayed–Waveguide Grating Multiplexer Module with Thermoelectric Device," *Journal of Lightwave Technology* 16(2):258–264 (1998).

Kaneko, et al. "Design and Applications of Silica–Based Planar Lightwave Circuits," *Journal of Selected Topics in Quantum Electronics* 5(5):1227–1236 (1999).

Keil, et al. "Thermo–Optic vertical coupler switches using hybrid polymer/silica integration technology," *Electronics Letters* 36(5):430–431 (2000).

Keil, et al. "Athermal polarization–independent all–polymer arrayed waveguide grating (AWG) multi/demultiplexer," PD7, pp. 1–3.

Kohtoku, et al. "Spotsize–Converter Integrated Semiconductor Arrayed Waveguide Grating with Low Loss and Low Polarization Dependent Loss," pp. 1555–1557.

Kokubun, "Athermal Waveguides and Temperature Insensitive Lightwave Devices," CLEO®/Pacific Rim 1999, pp. 1143–1144.

Kokubun, et al. "Athermal Waveguides for Temperature-Independent Lightwave Devices," *Photonics Technology Letters* 5(11):1297–1300(1993).

Kokubun, et al. "Temperature–independent optical filter at 1.55 $\mu$m wavelength using a silica–based athermal waveguide," *Electronics Letters* 34(4):367–369 (1998).

Kokubun, et al. "Three–dimensional arthermal waveguides for temperature independent lightwave devices," *Electronics Letters* 30(15):1223–1224 (1994).

Layadi, et al. "Low–loss optical waveguide on standard SOI/SIMOX substrate," *Optics Communications* 146:31–33 (1998).

Maru, "Athermal and Center Wavelength Adjustable Arrayed–Waveguide Grating," WH3, pp. 130–132.

Nadler, et al. "Polarization Insensitive, Low–Loss, Low–Crosstalk, Wavelength Multiplexer Modules," *Journal of Slected Topics in Quantum Electronics* 5(5):1407–1412 (1999).

Okamoto, et al. "Fabrication of multiwavelength simultaneous monitoring device using arrayed–waveguide grating," *Electronics Letters* 32(6): 569–570 (1996).

Ooba, et al. "Athermal silica–based arrayed–waveguide grating multiplexer using bimetal plate temperature compensator," *Electronics Letters* 36(21):1800–1801 (2000).

Sakamoto, et al. "Ceramic Substrate with Negative Thermal Expansion for Athermalization of Fiber Bragg Gratings," *Trans. Electron.* E83–C(9).

Smit, et al. "PHASAR–Based WDM–Devices: Principles, Design and Applications," *Journal of Selected Topics in Quantum Electronics* 2(2):236–250 (1996).

Sugita, et al. "Very Low Insertion Loss Arrayed–Waveguide Grating with Vertically Tapered Waveguides," *Photonics Technology Letters* 12(9):1180–1182 (2000).

Suzuki, et al. "Polarisation–insensitive arrayed–waveguide grating multiplexer with $SiO_2$–on–$SiO_2$ structure," *Electronics Letters* 30(8):642–643 (1994).

Takada, et al. "Beam–adjustment–free crosstalk reduction in 10 GHz–spaced arrayed–waveguide grating via photosensitivity under UV laser irradiation through metal mask," *Electronics Letters* 36(1):60–61 (2000).

Watanabe, et al. "Polymeric Optical Waveguide Circuits Formed Using Silicone Resin," *Journal of Lightwave Technology* 16(6):1049–1055 (1998).

Yamada, et al. "Crosstalk Reduction in a 10–GHz Spacing Arrayed–Waveguide Grating by Phase–Error Compensation," *Journal of Lightwave Technology* 16(3):364–371 (1998).

Yamada, et al. "Low–crosstalk arrayed–waveguide grating multi/demultiplexer with phase compensating plate," *Electronics Letters* 33(20):1698–1699 (1997).

* cited by examiner

APPARATUS FOR THERMAL COMPENSATION OF AN ARRAYED WAVEGUIDE GRATING

FIELD OF THE RELATED ART

The present invention generally relates to arrayed waveguide gratings and, more particularly, to an apparatus for thermal compensation of an arrayed waveguide grating.

BACKGROUND OF THE PRIOR ART

Increasingly, optical network designers have sought to determine the effects of environmental conditions on the performance of network equipment. The results suggest that the effects are sizable.

Employed in systems from local area networks (LAN) to nationwide communication networks, optical networks are a preferred way to achieve reliable, low-cost data transmission. Though designs vary depending on size, complexity and other factors, these networks are generally a complex system of interconnected optical components that perform signal input/output, switching, data processing, data analysis, and other functions.

Increasingly, as networks grow in size, optical components are placed in varied locations, some with climate control many without. Unfortunately, temperature variations affect the performance of many devices. Affected devices may introduce substantial loss into a network due to signal degradation and, in a worst-case scenario, may result in malfunction of the entire network. Many devices, such as arrayed waveguide gratings (AWGs), are susceptible to this detrimental temperature dependence.

Commonly, optical networks are wavelength division multiplexing (WDM) systems that transmit multiple data streams simultaneously as data channels, each channel being centered at a different wavelength or carrier frequency. In WDM systems, multiplexing and demultiplexing functions (i.e., the processes of combining and parsing channels) are often performed by AWGs.

An AWG generally includes an input waveguide and an array of output waveguides—each of varying optical path length—that produce an output pattern spatially separating-out the channels in the input signal. This channel separation depends upon the phase differences in the waveguide array, which makes AWGs very sensitive to environmental effects.

In attempting to control for environmental conditions, active temperature compensation in the form of thermostating devices has been used. Undesirably large amounts of power are required to run these devices, however. A few devices have been proposed with passive thermal compensation (e.g., structures that use thin film filters or regular gratings with bulk optics and structures with negative thermo-optic coefficient materials). Yet, these are expensive to fabricate and have inherent losses (both polarization independent and dependent loss). Also, their operative temperature ranges are limited due to linearity and temperature dependent losses. Reflection losses also limit device performance.

Other approaches include devices that control movement of a fiber support arm connected directly to an optical fiber. The fiber is moved by the support in response to temperature changes. These approaches, however, have numerous problems.

Accurately mounting and positioning the fiber support arm to the fiber is difficult. Further, fine-tuning support arm movement often requires complex structures, and, even with these, the fine-movement required is still not readily achievable. Also, there is nothing to prevent the support arm from moving vertically out of the plane of the AWG. Additionally, fabrication costs are high and stiction is a problem. Device scalability is also limited. And, for these designs and all of the above-described designs, the inherent losses are so great that larger-scale AWGs are not feasible.

DETAILED DESCRIPTION OF PREFERRED EXAMPLES

While preferred examples and numerous alternatives thereto are provided below, it will be appreciated by persons of ordinary skill in the art that these are merely examples and not intended to be exhaustive. On the contrary, the teachings herein may be used to form a great many arrayed waveguide gratings (AWGs) and other optical structures employing AWGs. Further, while the descriptions provided below are generally in the context of demultiplexer operation, the devices herein are reciprocal structures that may function as multiplexers, as well. Further still, while the approaches are described in the context of forming 1×N and N×N devices, with N equal to 4 in the depicted examples, the teachings herein may be used to form structures with N greater than 4, including structures with N much greater than 4. In fact, one of the advantages to the disclosed examples is that simple-to-fabricate-and-operate AWGs may now be formed with higher N-values.

Figure 1:
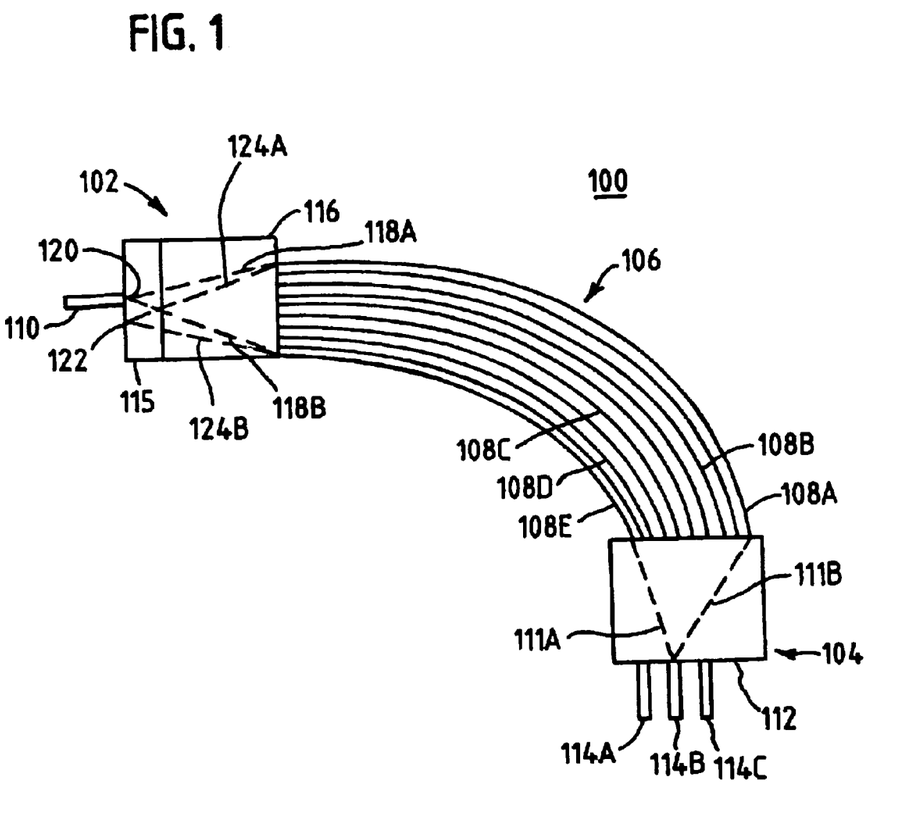
FIG. 1 is a top view of an example arrayed waveguide grating having a free propagation region with two sections shown in a first position.

FIG. 1 illustrates a top view of an example AWG 100. The AWG 100 is formed of a free propagation region 102 at an input end, a free propagation region 104 at an output end, and an array of waveguides 106 formed of individual waveguides 108A, 108B, 108C, 108D and 108E extending therebetween. It will be appreciated by persons of ordinary skill in the art that the number of waveguides (collectively 108) shown as forming the array 106 is only exemplary in nature, and may include a larger or smaller number of waveguides. Each waveguide 108A–E has an optical path length different than the other waveguides in the depicted example, for example, a $2\pi$ phase shift between neighboring channels.

By way of a general description of the operation of the AWG 100, an input waveguide 110 provides an input signal, which in a WDM system may include a plurality of channels, each channel representing a separate data stream and each channel centered at a slightly different wavelength. The input waveguide 110, as depicted, is a Planar Lightwave Circuit (PLC) structure, though more generally it represents an optical fiber or other waveguiding structures. The input signal is coupled through the free propagation region 102 into the array 106. The waveguides 108A–E create an interference pattern, i.e., example ray lines 111A and 111B, from the input signal in free propagation region 104. The interference pattern in free propagation region 104 spaces apart the different channels of the input signal at an outer face 112 of the free propagation region 104. For example, the highest wavelength channel may be at one lateral edge of the face 112 and the lowest wavelength channel may be at the opposing lateral edge of the face 112. For illustration purposes, the ray lines 111A and 111B are shown constructively interfering such that an output channel is coupled to a middle waveguide 114B of three output waveguides 114A–C. Other output channels would be coupled to the other output waveguides. Various materials may be used to form the AWG 100, of which silicon materials are an example.

As described above, state of the art AWGs are sensitive to variations in temperature. The AWG 100 offers temperature compensation without the need of external thermistors, temperature compensators, etc. In the illustrated example, compensation for temperature changes that would otherwise alter device performance is achieved by providing the free propagation region 102 with a first section 115 and a second section 116 that are movable relative to one another.

By way of example, FIG. 1 shows the AWG 100 optimized for operation at a given arbitrary temperature $T_1$. At temperature $T_1$, maximum constructive interference for a particular wavelength of the array 106, on the input side, occurs at the position of the input waveguide 110, as shown. That position is at an interference pattern nodal point 120 defined by the intersection of ray lines 118A and 118B (shown for exemplary purposes only). The optimum positions for the input waveguide 110, for example, may be those input locations from which the channels are demultiplexed to the output waveguides in the same desired order. Yet, under a temperature change for the array 106 from $T_1$ to temperature $T_2$, the optimum point for coupling into the AWG 100 moves from the nodal point 120 for $T_1$ to a nodal point 122 at temperature $T_2$. Nodal point 122 is the intersection of ray lines 124A and 124B. Thus, a temperature change of the array 106 from $T_1$ to $T_2$ moves the desired input signal position from point 120 to point 122.

Figure 2:
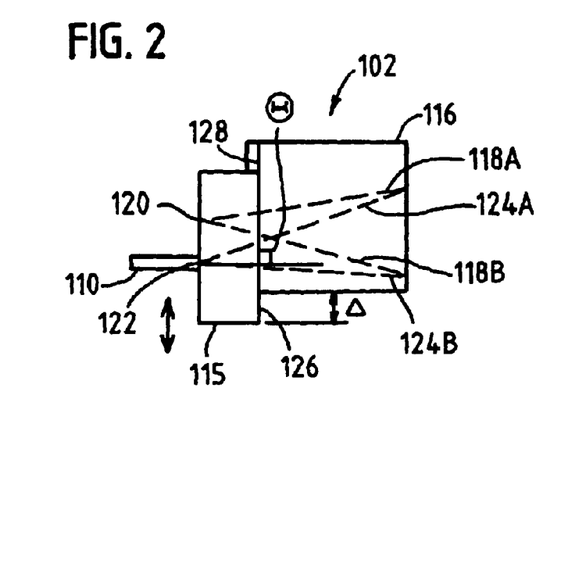
FIG. 2 is a top view of the free propagation region of FIG. 1 showing the two sections in a second position.

To compensate for this change, the first section 115 moves laterally with respect to the second section 116 until the input waveguide 110 is positioned at the new optimum input position point 122. FIG. 2 shows the free propagation region 102 optimized for operation at temperature $T_2$. The first section 115 has moved laterally a distance, $\beta$, which is equal to the lateral distance between nodal points 120 and 122. For all waveguides and wavelength combinations, this shift is essentially the same; thus, the movement compensates all channels. As used herein, lateral movement refers to movement along a plane orthogonal to a direction of propagation within an input or output fiber, and longitudinal movement is substantially along that direction of propagation. By moving the input waveguide 110 from nodal point 120 to nodal point 122, the interference pattern defined by rays 111A and 111B is unchanged despite the temperature change. Without moving the input waveguide 110 from nodal point 120, the cyclical nature of the AWG 100 would result in a movement of the interference pattern at face 112, such that the same channel would no longer be coupled into waveguide 114B.

As shown in FIGS. 1 and 2, the free propagation region 102, which may be formed of a silicon material, though other known optically transparent materials may be used, has the first section 1115 with an inner face 126 that is substantially parallel to an adjacent inner face 128 of the second section 116. The inner faces 126 and 128 may be achieved, for example, by fabricating the entire free propagation region 102 as a unitary structure, then cutting the structure to form the first section 115 and second section 116, and then polishing of the faces 126 and 128, if necessary. Laser cutting or mechanical cutting, e.g., a diamond saw set at an angle to the cutting surface, are examples. Additionally, it may be desirable to use a planar polishing to smooth the cleaved surfaces.

The faces 126 and 128 are not only substantially parallel, but they each extend orthogonally to a direction of propagation of the input waveguide 110. As shown in FIG. 2, each face forms an angle $\Theta$ equal to 90°. The angle $\Theta$ as used herein refers to the angle between the direction of propagation from an input or output waveguide and the edge of an inner face as seen from a plan view. The various inner faces herein are describable, in part, by their "$\Theta$-cut", i.e., a cut with a specific angle on $\Theta$. While FIG. 2 shows $\Theta$ equal to 90°, $\Theta$ may be less than 90°.

Figure 3A:
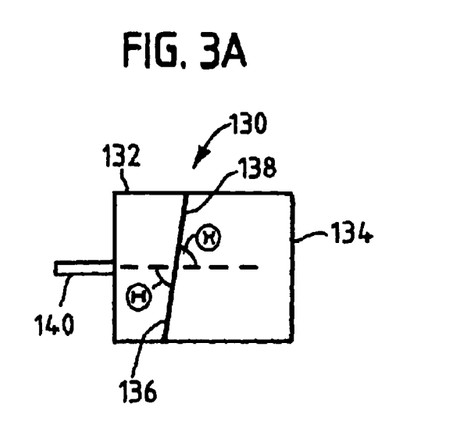
FIG. 3A is a top view of an example free propagation region in which two sections form an angle with a direction of propagation.
Figure 3B:
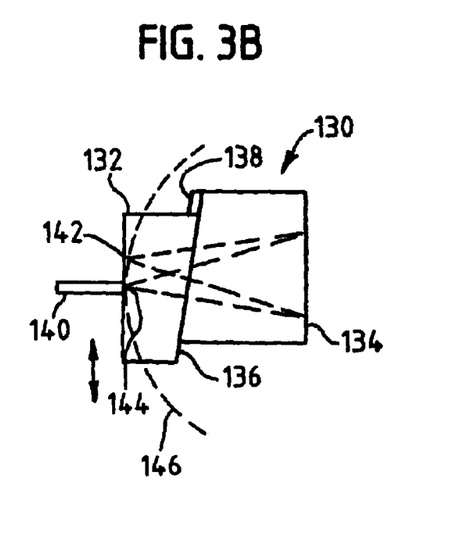
FIG. 3B is a top view of the free propagation region of FIG. 3 in a second position.

FIGS. 3A and 3B show an alternative input free propagation region 130 formed of a first section 132 and a second section 134 each having inner faces 136 and 138, respectively. As shown in those figures, in this example, the inner faces 136 and 138 are substantially parallel, but each also form acute $\Theta$ angles; i.e., the inner faces 136 and 138 have acute $\Theta$-cuts. Therefore, the movement of the first section 132 relative to the second section 134 is as shown in FIG. 3B (i.e., it has a component of movement along the axis of propagation). The illustrated $\Theta$-cut results from an angular cut of a unitary free propagation region. The illustrated examples also show an input waveguide 140 like the waveguide 110 and that may provide an input signal. e.g., a multiple channel input signal.

As is known to persons of ordinary skill in the art, a temperature change from, for example $T_1$ to $T_2$, moves the optimum position for constructive interference. This movement however, is not a purely translational movement but instead the optimum point moves along an arcuate path known as a Roland circle. An exemplary movement of a nodal position 142 (optimized for temperature $T_1$) to a nodal position 144 (optimized for a temperature $T_2$) along a Roland circle 146 is shown in FIG. 3B. The acute $\Theta$-cut on the inner faces 134 and 138 partially compensates for the movement of the optimum nodal points along this circle, by not only laterally moving the input waveguide, but slightly longitudinally moving it as well. Thus, focusing error is controlled by varying the $\Theta$-cut angle to a desired acute angle.

Figure 4:
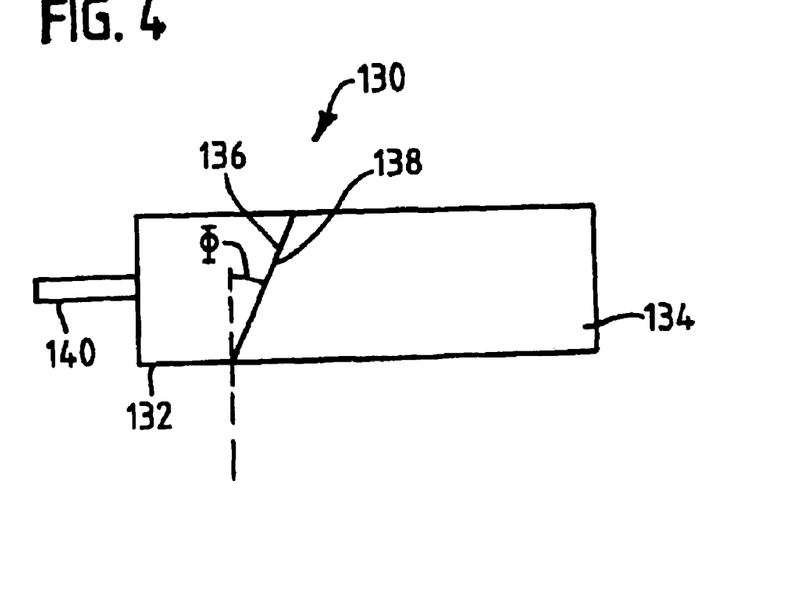
FIG. 4 is a side view of the structure of FIGS. 3A and 3B.

The inner faces of FIGS. 1–3B are also cut along a $\Phi$-cut with $\Phi$ greater than 0°. The angle "$\Phi$" refers to an angle between a normal to the planar top surface of a substrate and an edge of the inner face as seen from a side view. FIG. 4 shows the AWG 130 from a side view showing a Φ-cut. A Φ-cut with Φ greater than 0° may reduce any reflection losses at the interface of faces 136 and 138. By way of example and not limitation, angles of 5–8° may be used for Φ. Nevertheless, Φ could be any angle within a range of angles including 0°. Additionally, while the inner faces 136 and 138 are cut such that face 136 is above face 138 (i.e., the inner faces have positive slope in FIG. 4), alternatively, the orientation may be reversed with inner face 138 above inner face 136 (i.e., the inner face having a negative slope in FIG. 4).

Figure 5:
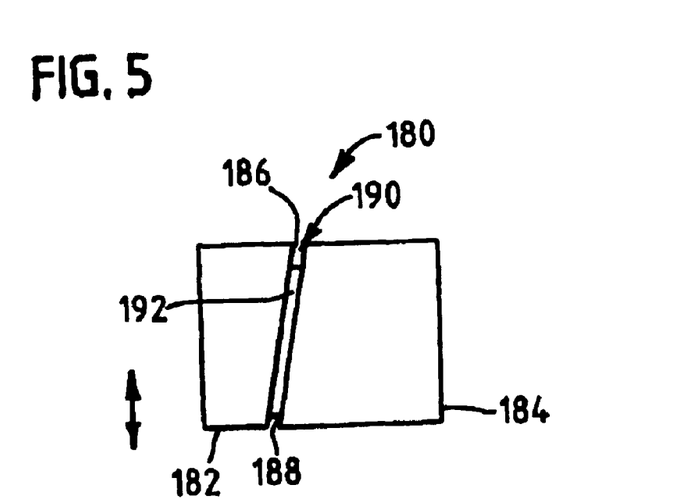
FIG. 5 is a top view of an alternative free propagation region in which a first section is spaced from a second section.

The above examples show substantially parallel and abutting inner faces for the various free propagation regions. Alternatively, the inner faces shown may be spaced apart, with or without an index matching region defined therebetween. Such an example free propagation region 180 is shown in FIG. 5, where a first section 182 and a second section 184 have inner faces 186 and 188, respectively, that define a gap 190. In this example, the gap 190 is shown with an index matching fluid or gel 192. The gel 192 allows the first and second sections 182 and 184 to move relative to one another, while maintaining a substantially lossless coupling of energy between the two. The gap 190 may instead be an air gap.

Figure 6:
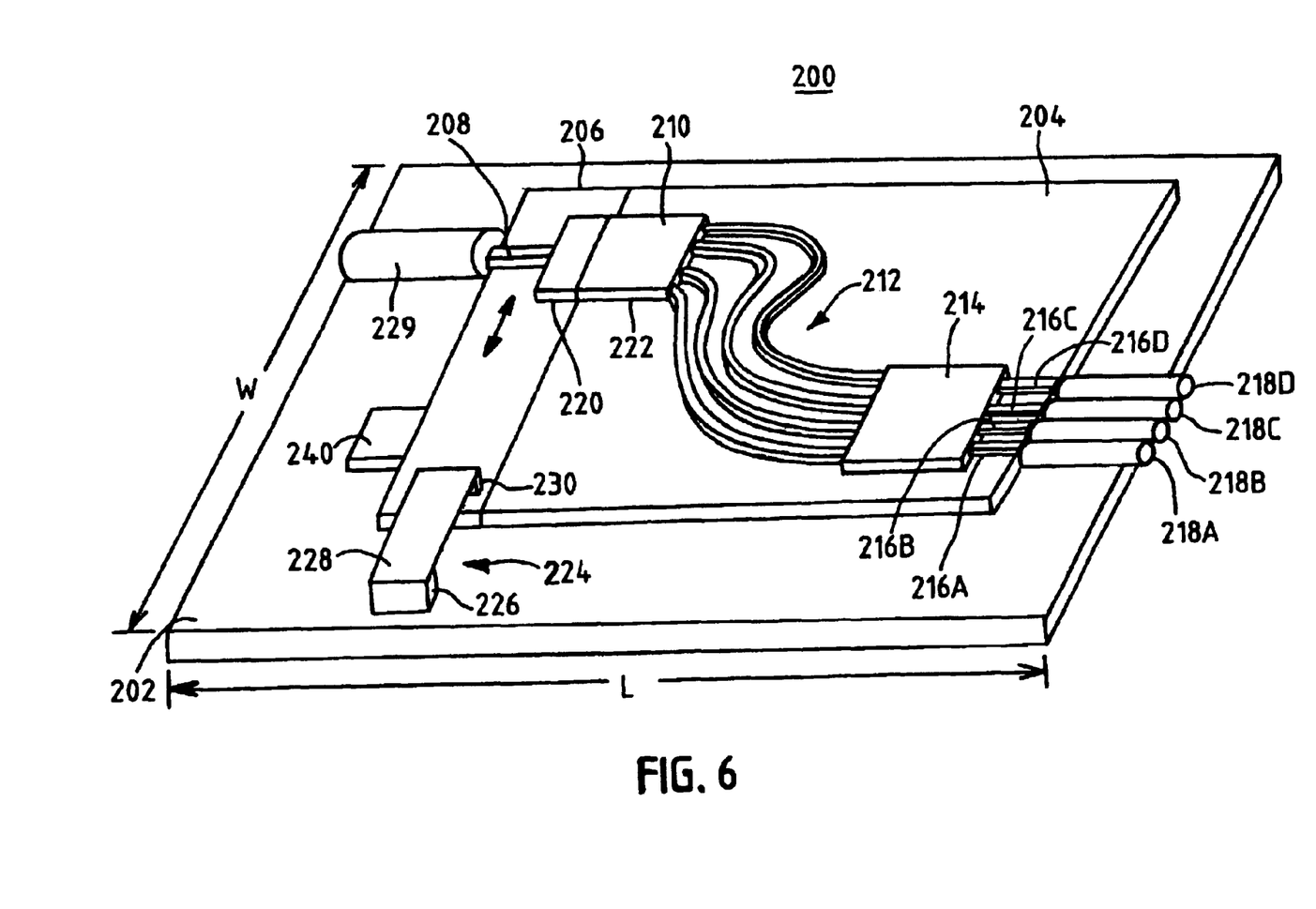
FIG. 6 is an illustration of an example arrayed waveguide grating showing a thermally responsive actuator, an input fiber and output fibers.

FIG. 6 is an illustration of an exemplary AWG 200 in a near-completely packaged form. The AWG 200 includes a mounting board 202 having a first substrate section 204 and a second substrate section 206 mounted thereto. The mounting board 202 may be formed of known materials such as silicon materials or ceramic, and the substrate sections 204 and 206 may be similarly formed through known techniques.

Regarding the mounting in the example shown, substrate section 204 is rigidly mounted to the top surface of mounting board 202 so that the substrate 204 does not move. Substrate 206 is mounted for relative movement laterally across a width of the mounting board 202. The substrate 204, for example, may be adhesively mounted to the mounting board 202 whereas the substrate 206 is positioned on the mounting board 202 but otherwise free for lateral movement. A nonstick coating or treatment may be applied to the mounting board at the locations over which the substrate 206 is intended to move.

An input waveguide 208 is formed on a top surface of the substrate 206 and abuts a free propagation region 210 straddling both waveguide section 206 and waveguide section 204. Extending from the free propagation region 210 is a waveguide array 212 that terminates in a second free propagation region 214 all formed on the top surface of the substrate 204. In the illustrated example, extending from the free space propagation region 214 are a plurality of output waveguides 216A, 216B, 216C and 216D, individually coupled into corresponding output fibers 218A–D, respectively, using known techniques. The substrates 204 and 206, the input waveguide 208, the free propagation region 210, waveguide array 212, free propagation region 214 and output waveguides 216 may be fabricated during the same deposition/etching process to reduce fabrication costs and allow for batch fabrication.

Free propagation region 210 includes a first section 220 and a second section 222. These sections, along with the sections 206 and 204 are formed during fabrication, for example, through mechanical diamond saw cutting or laser cutting. In the example shown, the inner faces of the two sections 220 and 222 are cut with Θ equal to 90°. These inner faces may also be cut with a Φ-cut of Φ greater than 0°, as described with reference to FIG. 4.

The section 206 along with first section 210 is moved by a position adjuster in the form of a thermally responsive actuator, which in the depicted example is an arm assembly 224. The arm assembly 224 is mounted to the mounting board at a base 226, which mounting may be by adhesive mounting, bond mounting, clamping, soldering, spot or laser welding or other suitable techniques. An arm 228 extends from the base 226 to a distal end affixedly mounted to the substrate 206, a mounting which, in the example shown, is achieved through a support segment 230 mounted to the substrate 206. The arm 228 is formed of a thermally expanding and contracting material such that, as changes occur in the temperature of the AWG 200, the arm laterally expands or contracts in response thereto and thereby laterally moves the substrate 206. Various known metals and alloys may be used to form the arm 228. For example, if a 0.2 $\mu$m/C. ° displacement is desired to correct for temperature variations, for a 1 cm length arm, the difference between the thermal expansion coefficient of the arm and that of the backing material would be $2 \times 10^{-5}$. An input fiber 229 is attached to an end face of the substrate 206 for coupling to the input waveguide 208. The fiber 229 also moves with the thermal actuation (expansion and contraction) of the arm 228.

The movable substrate 206, as shown, is prevented from non-lateral movement to ensure proper alignment and operation of the AWG 200. Though, alternatively some longitudinal movement may occur with an acute Θ-cut, for example. In the depicted example, vertical movement (i.e., away from the top surface of the mounting board) is also prevented by the actuator 224, which applies a sufficient downward force on the substrate 206 to clamp it against upward movement. A spring biasing structure or separate clamping may alternatively or additionally be used. Longitudinal movement (i.e., movement of the substrate 206 along the length, L) is prevented by a back stop 240 (only generally shown). By way of example and not limitation, the back stop 240 may be a fixed guide, a spring biasing member applying a force to abut the section 206 against section 204, or a combination of the two. Using a spring biasing structure has the added advantage of biasing the first section 220 to the second section 222 to allow for less coupling loss in the system.

The stop 240 is positioned, by way of example, at an end of the substrate 206. The positioning may be changed and a larger back stop or multiple back stops may alternatively be used. The back stop 240 is positioned and shaped to ensure purely lateral movement of the substrate 206, without any angular movement thereof. Thus, with a spring biasing structure, the force on the substrate 206 is solely in the longitudinal direction to avoid substrate rotation.

Suitable spring clamps will be known. By way of example and not limitation, these include micro-electromechanical (MEMs) structures, such as the various cantilevered spring biasing structures used in some optical applications, as well as more general circuit board clamping/biasing structures.

Although the actuation of a portion of the AWG 200 shown in FIG. 6 is achieved via a thermally responsive arm, other actuation mechanisms allowing for lateral movement may be used. As shown, movement is achieved through passive actuation, i.e., actuation based upon thermal expansion. Alternatively, an active actuation mechanism can be used in which the lateral position of the appropriate structure is controllably moved via a controller, processor, or the like in response to changes in the temperature. In the latter examples, a thermistor or other temperature measuring structure may be used, as an input to the controller. Movement could be stepwise or continuous.

Figure 7:
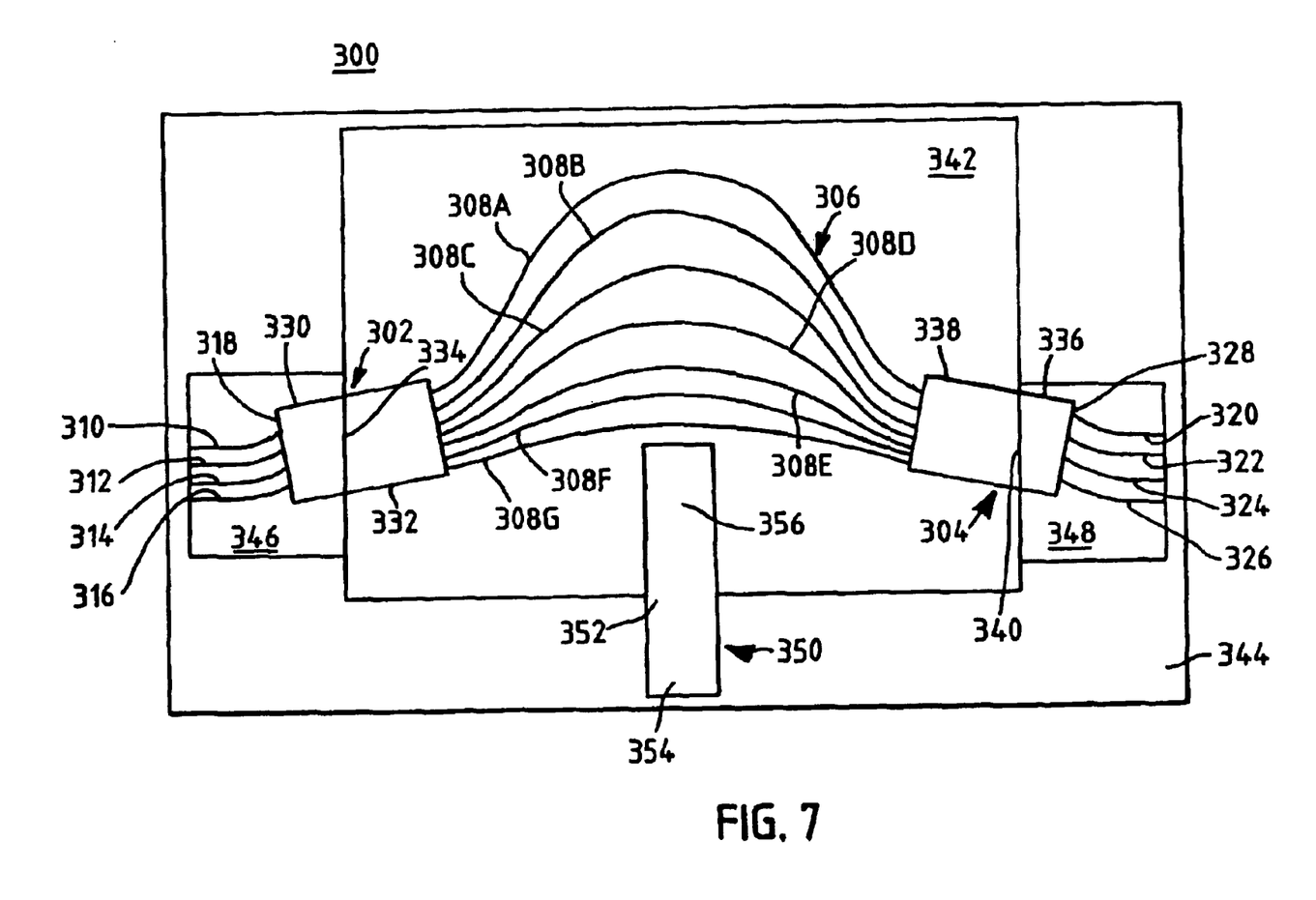
FIG. 7 is top view of an arrayed waveguide grating having two free propagation regions, each with two sections that are movable relative to one another.

FIG. 7 illustrates another example AWG 300. Where the above structures show a single free space propagation region being split into a fixed section and another section movable relative thereto, in the example of FIG. 7, each free propagation region includes two sections that are movable relative to one another. Providing such two-section lateral adjustment permits less physical movement of the AWG structure in response to changes in thermal conditions while achieving similar optical optimization results. Thus, more compacted devices be formed, i.e., devices that require less lateral range of movement. Also, since the error in misalignment from the ideal constructive interference point along the Roland circle is a non-linear (quadratic) term, minimizing lateral movement substantially reduces any error involved in lateral displacement correction. Another advantage resulting in part from the reduction in lateral displacement required to compensate for a given temperature mismatch, is that previously-unattainable N×N AWG structures may be fabricated, because there is less loss in the thermal compensation apparatus.

Of course, one of the most notable advantages is that more complex optical circuits and more compact optical components may now be implemented with an N×N AWG having a large N-valve. Furthermore, not only will device and network functionality be enhanced, but device manufacture and stability will be increased. The N×N structure, for example, may be used with fiber ribbons supplying the input fibers and the output fibers. Fiber ribbons are more stable structures than single optical fibers and more easily mounted and packaged into an optical component. Also, with input and output fibers rigidly mounted to substrates, the force used to compensate for temperature changes is lowered and fiber twisting problems are eliminated.

The AWG 300 includes a first propagation region 302, a second propagation region 304, and a waveguide array 306 extending therebetween. These structures are formed of silicon material(s) or other known materials using known deposition and etching techniques. The waveguide array 306, as shown, includes waveguides 308A–308G, though more or less may be used. Input waveguides 310, 312, 314 and 316 are coupled to an input face 318 of the free propagation region 302. And output waveguides 320, 322, 324 and 326 are coupled to an output face 328 of the free propagation region 304.

Similar to the example shown in FIG. 4, the free propagation region 302 includes a first section 330 and a second section 332 meeting at an inner face boundary. That boundary (shown by reference numeral 334) forms an acute angle Θ. Also, free propagation region 304 includes a first section 336 and a second section 338 meeting at an inner face boundary 340 that is also formed with an acute Θ. Alternatively, one or both of the inner face boundaries 334 and 340 may have Θ equal to 90°. In any event, the example depicts an AWG in which an input waveguide (or fiber) is moved along an angle path to compensate for thermal variations.

In the example of FIG. 7, the input waveguides 310–316 and the output waveguides 320–326 are both held in place, and the waveguide array 306 is moved laterally. To achieve the lateral movement, the waveguide array 306, the second portion 332, and the second portion 338 are all mounted on a movable substrate 342 that rests on a mounting board 344.

The waveguide array 306, and the second portions 332 and 338 may be fabricated on, disposed on, or otherwise formed on the movable substrate 342. The first section 330 and input waveguides 310 are formed on a substantially fixed substrate 346, and the first section 336 and the output waveguides 319 are formed on a substantially fixed substrate 348. In this example, substrates 346 and 348 do not move during thermal compensation, though these structures may be otherwise movable (e.g., longitudinally movable during assembly to retain the substrate 342 in place).

The movable substrate section 342 is held in place by a thermally responsive actuator 350. The actuator 350 also prevents vertical movement of the substrate 342 (i.e., out of the mounting board plane movement). Alternatively or additionally, the substrate 342 may be spring-biased against vertical movement. In fact, any of the substrates 342, 344, and 348 may be biased against vertical movement by a spring, clamp, or other suitable structure, in addition to the biasing forces applied by those structures already depicted. The substrate 342 is restrained from longitudinal movement by the substrates 346 and 348.

The thermally responsive actuator 350 is similar to the actuator 224 and moves the movable substrate 342 longitudinally in response to thermal changes at the waveguide array 306. The actuator 350 includes an arm 352 formed of a material having a thermal expansion coefficient different than the thermal expansion coefficient of the mounting board 344, to achieve relative movement therebetween. The mounting board 344 may be ceramic and the arm 352 a low-thermal-coefficient-of-expansion metal. The arm 352 is mounted to the mounting board at a location 354 and mounted to the movable substrate 342 at a location 356. Bonding, clamping, adhesion, or other methods may be used. The length of the arm 352 and the thermal coefficient of expansion, in particular the relative difference between the thermal coefficient of expansion between the arm 352 and that of the mounting board 344, are set to achieve the desired lateral movement of the substrate 342 for compensating various changes in the thermal conditions of the array 306.

Figure 8:
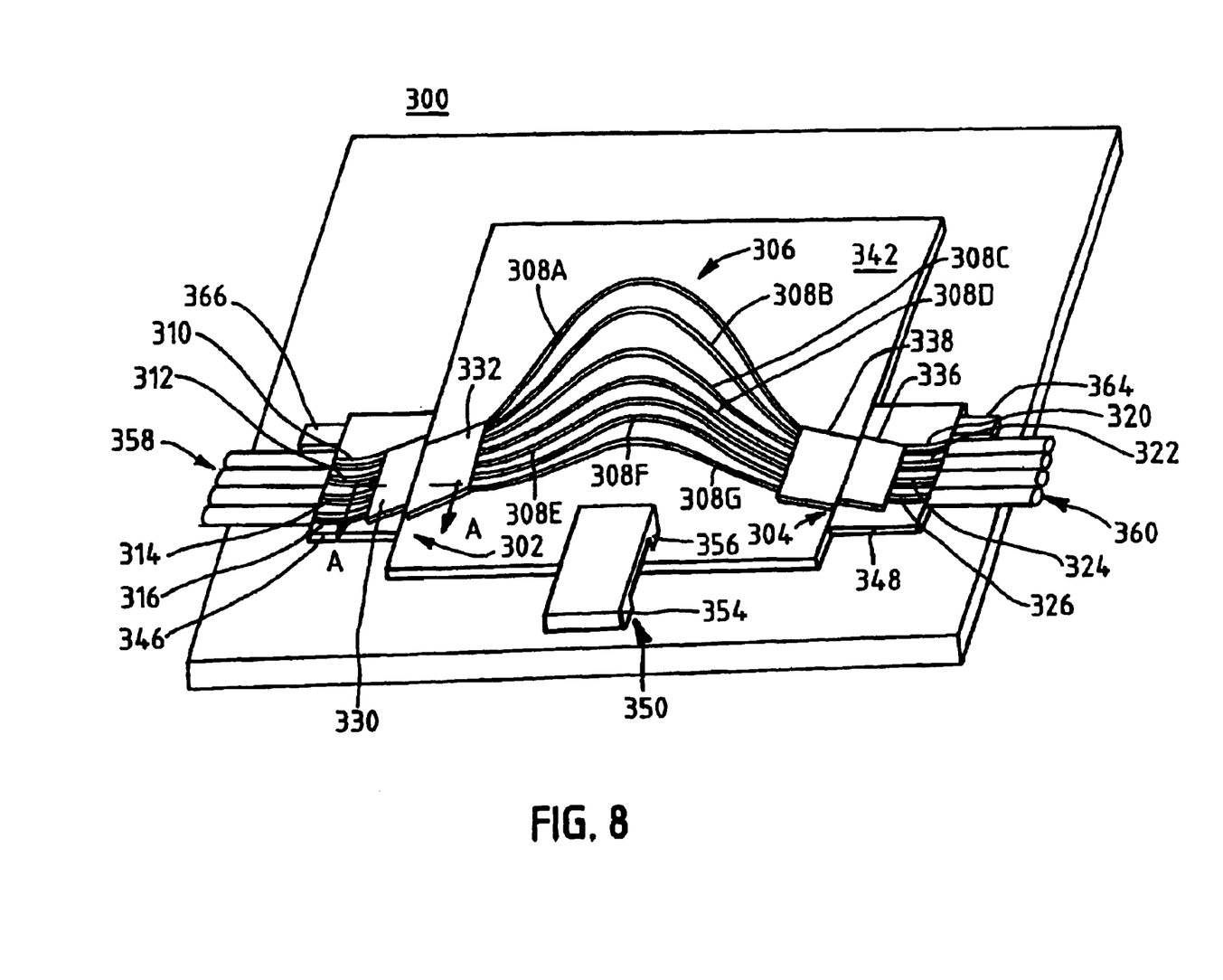
FIG. 8 is an illustration of the arrayed waveguide grating of FIG. 7 showing the coupling of fiber ribbons to the arrayed waveguide grating and showing the arrayed waveguide grating in a second position.

FIG. 8 shows a perspective illustration of the AWG 300 with a first four-fiber ribbon 358 mounted to the free propagation region 302 and a second four-fiber ribbon 360 mounted to the propagation region 304. FIG. 8 shows the AWG 300 in a second position from that of FIG. 7 in which arm 352 has contracted in response to a thermal change and pulled the moveable substrate 342. The AWG 300 is initially optimized for demultiplexing individual channels of a multi-channel input signal to the waveguides 320, 322, 324, and 326 in a specific order. As the temperature changes, the actuator 350 moves the substrate 342 to retain the coupling of these channels into that same specific order of output waveguides. Thus, the AWG 300 is transparent to other components connected thereto despite changes in thermal conditions.

The free propagation regions 302 and 304 may be formed of any of the structures described herein, e.g., those shown in FIGS. 2–5. As depicted in FIG. 8, they are formed with two spring biasing structures 364 and 366 applying equal force to the substrates 348 and 346, respectively, to establish an abutting contact at their respective inner faces. Bringing the inner faces into contact results in better coupling within each free propagation region 304 and 302, because there will be less reflection loss. The spring structures 364 and 366 apply equal force to prevent the substrate 342 from rotating or otherwise moving longitudinally. The inner faces may be polished and also anti-reflection coated to reduce any reflection loss even further. And, if the inner faces are spaced apart, as in FIG. 5, an index matching fluid or gel may be used in the space between the inner faces.

The mounting of the movable substrate 342 to the mounting board 344 may be achieved through known techniques. Also, a series of ridges or bumps may be used on the undersurface of the substrate 342 or on the upper surface of the mounting board 344 to reduce stiction and sensitivity to trapped particles. Additionally, a thin sheet may be disposed between the mounting board 344 and the substrate 342 (and/or the substrates 346 and 348) to facilitate smooth movement.

Mounting the array 306 to substantially float above the mounting board 344 ensures that very little thermal stress is transferred to the array 306. Also, since the fiber ribbons 358 and 360 are mounted on stationary parts of the assembly no appreciable twisting or shear stress is transferred to the structure. As a result, polarization-dependent loss is reduced. Also, with fibers that are held substantially in place, less force and less device movement are required to compensate for thermal variations, thereby creating a more robust design.

Figure 9:
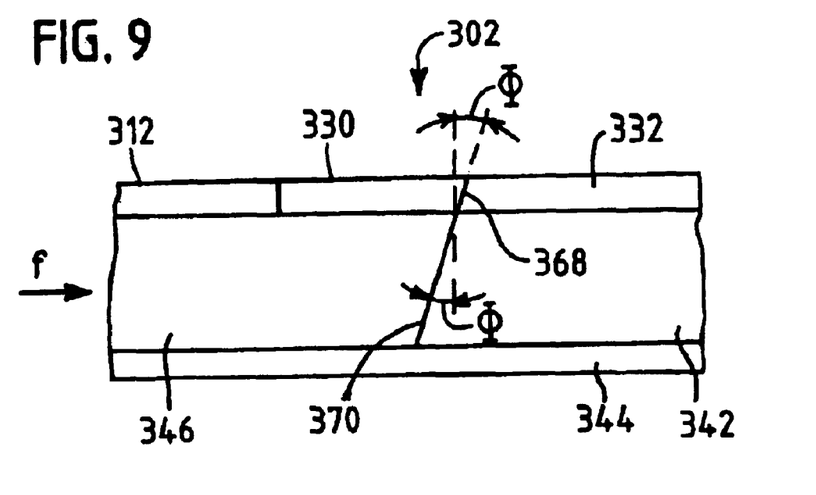
FIG. 9 is a side view of an example free propagation region for the structure of FIG. 8.
Figure 10:
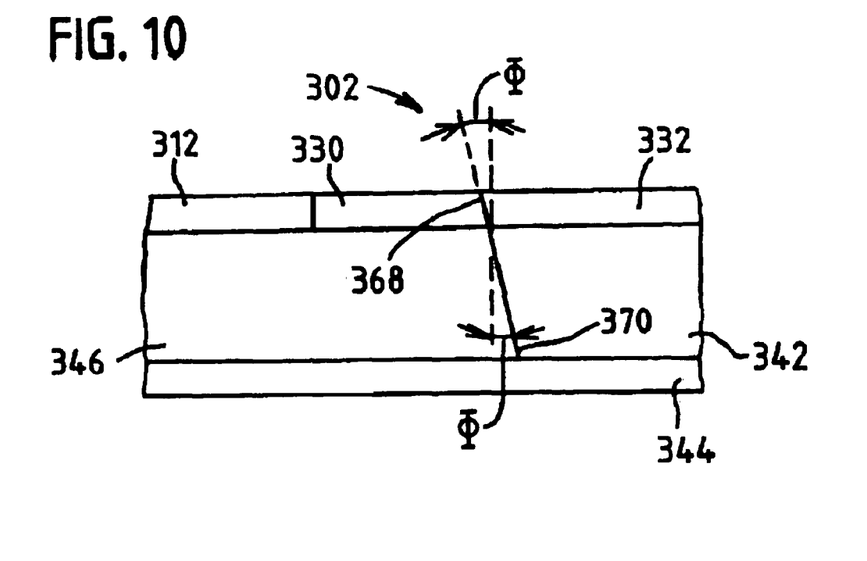
FIG. 10 is a side view of another example free propagation region for the structure of FIG. 8.

FIGS. 9 and 10 show two example side views of the AWG 300 taken along lines A—A in FIG. 8. FIG. 9 shows the free propagation region 302 formed with one Φ-cut such that the inner face boundary 368 has the inner face of section 332 below the inner face of section 330 (i.e., a positive slope in FIG. 9). The inner face boundary 370 between the substrate 346 and the substrate 342 is similarly oriented in the example shown. In this configuration, a longitudinal biasing force, f, from the spring bias 366 pushes against the inner face boundary 368, which, due to the angle on Φ, pushes the substrate 342 against the mounting board 344 and helps prevent any vertical movement of the substrate 342. Alternatively, FIG. 10 shows the free propagation region 302 with another Φ-cut with Φ greater than 0°. This configuration allows for easy mounting of the substrate 342 between the two substrates 346 and 348 during device assembly. In either embodiment, the Φ-cuts reduce any reflection losses within the free propagation region 302. Similar cuts are used on free propagation region 304, though the Φ-cuts may be different. Thus, as evidenced by the structures shown in FIGS. 7–10, an N×N AWG couplable to ribbon fibers is provided.

Also, L×M AWG devices, where L does not necessarily equal M and where either may be larger or smaller than the number of channels in the system, may be formed in a similar manner given the teachings herein.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An arrayed waveguide grating comprising:
   an array of waveguides, the array having an input end for receiving an input signal and an output end coupled to an output region at which an interference pattern of the input signal is provided;
   a free propagation region coupled to the input end, the free propagation region including a first section and a second section being movable relative to one another within a longitudinal plane containing a direction of propagation to controllably adjust the position of the interference pattern in the output region, an inner face of the first section and an inner face of the second section having a Θ-cut, as determined from a plane extending orthogonally to the longitudinal plane and forming an angle Θ with the direction of propagation, with a Θ less than 90°, and the inner face of the first section and the inner face of the second section having a Φ-cut, as determined from a plane extending out of the longitudinal plane at an angle Φ, with the Φ greater than 0° and less than 90°:
   a spring positioned to longitudinally bias the first section toward the second section; and
   a thermally responsive actuator for moving the first portion and the second portion relative to one another in response to a thermal change.

2. The arrayed waveguide grating of claim 1, wherein the array of waveguides and the second portion of the free propagation region are mounted on a fixed substrate, and wherein the first portion of the free propagation region is mounted on a movable substrate.

3. The arrayed waveguide grating of claim 1, wherein the array of waveguides and the second portion of the free propagation region are mounted on a movable substrate, and wherein the first portion of the free propagation region is mounted on a fixed substrate.

4. The arrayed waveguide grating of claim 1, wherein the responsiveness of the thermally responsive actuator is such that the interference pattern in the output region maintains its position at an outer plane under a thermal change.

5. The arrayed waveguide grating of claim 1, wherein the first section and the second section define a gap therebetween, and wherein an index matching medium is located in the gap.

6. The arrayed waveguide grating of claim 1, wherein the inner face of the first section and the inner face of the second section have a Φ-cut tilting toward the array of waveguides.

7. The arrayed waveguide grating of claim 1, wherein the inner face of the first section and the inner face of the second section have a Φ-cut tilting away from the array of waveguides.

8. A method of compensating for thermal variations in an array waveguide grating comprising:
   providing an array of waveguides, each waveguide having an optical path length that differs from at least one other waveguide, the array of waveguides having an input end and an output end;
   coupling a first free propagation region to the input end, the first free propagation region having a first section and a second section movable relative to one another;
   coupling a second free propagation region to the output end, the second free propagation region having a third section and a fourth section movable relative to one another;
   laterally biasing at least one of the first section toward the second section or the fourth section toward the third section; and
   in response to the thermal variations, controllably moving the first section and the second section relative to one another and controllably moving the third section and the fourth section relative to one another to compensate for the thermal variations.

9. The method of claim 8, further comprising;
   fixedly coupling at least one input waveguide to the first section;
   fixedly coupling at least one output waveguide to the fourth section;

restraining the first section and the at least one input waveguide against movement;

restraining the fourth section and the at least one output waveguide against movement;

controllably moving the second section relative to the first section; and controllably moving the third section relative to the fourth section.

10. The method of claim 8, further comprising:

laterally biasing the first section toward the second section using a first spring mechanism; and laterally biasing the fourth section toward the third section using a second spring mechanism, the first spring mechanism and the second spring mechanism applying an equal and opposite lateral force.

11. The method of claim 8, further comprising:

rigidly mounting the first section to a support;

rigidly mounting the fourth section to the support;

mounting the second section, the third section and the array of waveguides to a movable substrate; and moving the movable substrate via a thermally responsive actuator coupled to the movable substrate and the support.

12. The method of claim 8, further comprising:

providing an inner face of the first section and an inner face of the second section such that both have a first Φ-cut where Φ is larger than 0° and less than 90°, wherein the Φ-cut is determined from a plane extending out of a longitudinal plane at an angle Φ, the longitudinal plane containing the array of waveguides; and providing an inner face of the third section and an inner face of the fourth section that both have a second Φ-cut where Φ is larger than 0° and less than 90°.

13. The method of claim 12, wherein at least one of the first Φ-cut and the second Φ-cut tilts toward the array of waveguides.

14. An arrayed waveguide grating comprising:

a first free propagation region formed of a first section and a second section, the second section and the first section being movable relative to the one another;

a second free propagation region formed of a third section and a fourth section, the third section and the fourth section being movable relative to one another;

a waveguide array coupled between the first free propagation region and the second free propagation region; and a thermally responsive actuator coupled to the second section and the third section, wherein the second section and the third section are fixedly mounted to a movable substrate, and wherein the thermally responsive actuator is mounted to the movable substrate for moving the movable substrate, the thermally responsive actuator being mounted to the movable substrate at a first end and mounted to a mounting board at a second end.

15. The arrayed waveguide grating of claim 14, wherein the first section has a first inner face substantially parallel to a second inner face of the second section, wherein the first and second inner faces each have a first acute angle for Θ, wherein Θ is determined from a plane extending orthogonally to a longitudinal plane containing the array of waveguides and forming the angle Θ with a direction of propagation.

16. The arrayed waveguide grating of claim 15, wherein the third section has a third inner face substantially parallel and adjacent a fourth inner face of the fourth section, wherein the third and fourth inner faces each have a second acute angle for Θ.

17. The arrayed waveguide grating of claim 16, wherein at least the first inner face and the second inner face or the third inner face and the fourth inner face define a gap.

18. The arrayed waveguide grating of claim 17, wherein the gap contains an index matching region.

19. The arrayed waveguide grating of claim 14, wherein the mounting board and the thermally responsive actuator have different thermal expansion coefficients.

20. The arrayed waveguide grating of claim 14, further comprising a spring biasing the movable substrate against the mounting board to substantially prevent vertical movement of the movable substrate.

21. The arrayed waveguide grating of claim 14, wherein the thermally responsive actuator is formed of a metallic arm.

22. The arrayed waveguide grating of claim 14, further comprising a plurality of input fibers coupled to the first free propagation region to supply input signals and a plurality of output fibers coupled the second free propagation region for receiving a plurality of output signals.

23. The arrayed waveguide grating of claim 22, wherein the plurality of input fibers and the plurality of output fibers form an N×N configuration.

24. The arrayed waveguide grating of claim 22, wherein the plurality of input fibers are formed of a first fiber ribbon and the plurality of output fibers are formed of a second fiber ribbon and wherein the first fiber ribbon and the second fiber ribbon are mounted to stay substantially stationery during movement of the second section and the third section.

25. The arrayed waveguide of claim 14, wherein the first section has a first inner face and the second section has a second inner face where the first inner face and the second inner face have a first Φ-cut with an angle Φ greater than 0° and less than 90°, where the first Φ-cut is determined from a plane extending out of a longitudinal plane containing the waveguide array and at the angle Φ.

26. The arrayed waveguide of claim 25, wherein the third section has a third inner face and the fourth section has a fourth inner face, where the third inner face and the fourth inner face have a second Φ-cut with the angle Φ greater than 0° and less than 90°, where the second Φ-cut is determined from a plane extending out of a longitudinal plane containing the waveguide array and at the angle Φ.

* * * * *

UNITED STATES PATENT AND TRADEMARK OFFICE
CERTIFICATE OF CORRECTION

PATENT NO. : 6,954,566 B2 Page 1 of 1
APPLICATION NO. : 10/205275
DATED : October 11, 2005
INVENTOR(S) : Kjetil Johannessen It is certified that error appears in the above-identified patent and that said Letters Patent is hereby corrected as shown below:

In the Claims:

At Column 10, line 29, "under a thermal" should be -- under the formal --.

At Column 11, line 43, "to the one another" should be -- to one another --.

At Column 12, line 33, "coupled the" should be -- coupled to the --.

Signed and Sealed this

Twenty-first Day of August, 2007

JON W. DUDAS
*Director of the United States Patent and Trademark Office*